June 18, 1957
A. B. MOEN
2,795,871
SNOW PLOW
Filed Nov. 26, 1951
2 Sheets-Sheet 1
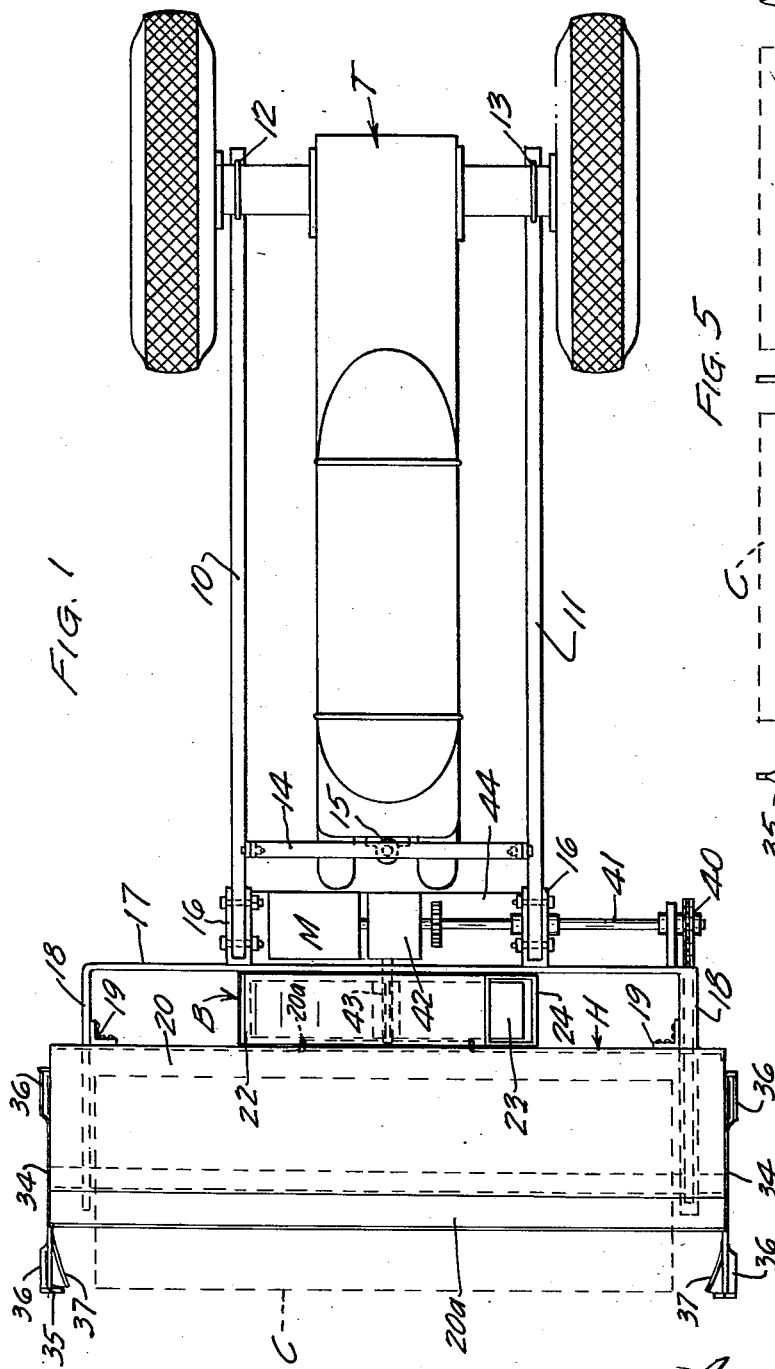
INVENTOR
Anver B. Moen
BY Williamson & Williamson
ATTORNEYS June 18, 1957 — A. B. MOEN — 2,795,871
SNOW PLOW
Filed Nov. 26, 1951 — 2 Sheets-Sheet 2
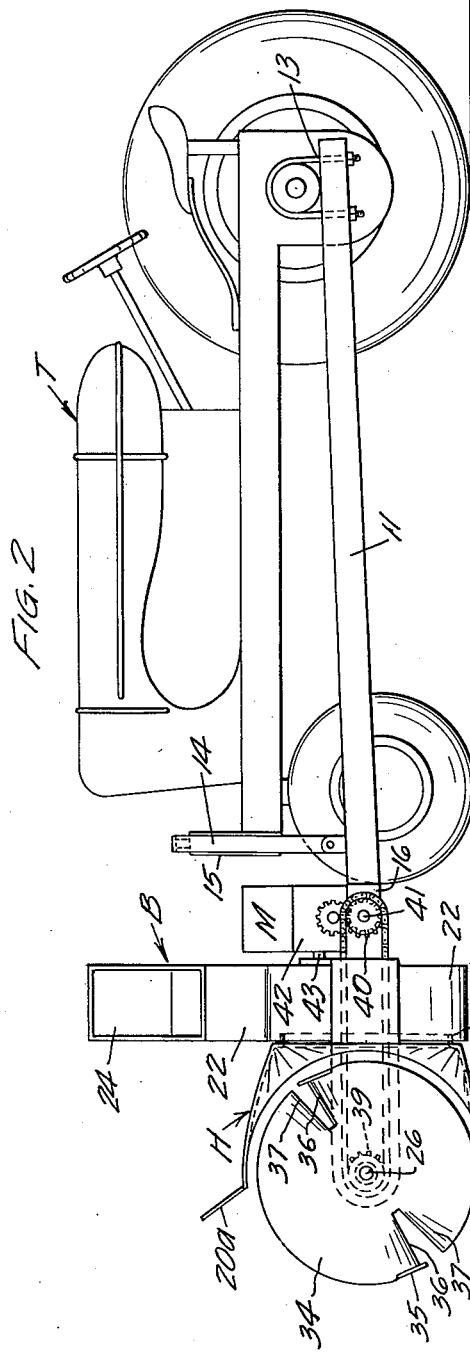
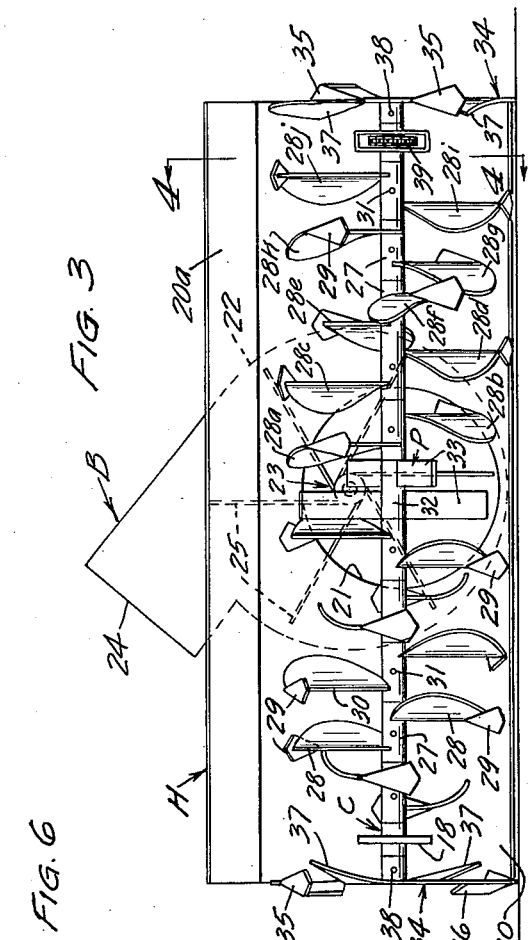
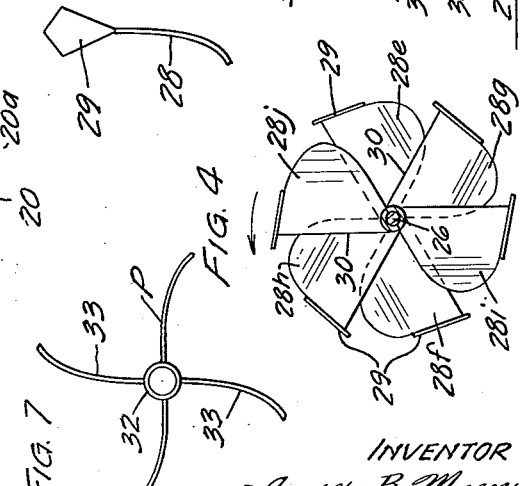
INVENTOR
Anver B. Moen
BY Williamson & Williamson
ATTORNEYS United States Patent Office 2,795,871
Patented June 18, 1957

2,795,871

SNOW PLOW

Anver B. Moen, St. James, Minn.

Application November 26, 1951, Serial No. 258,216

19 Claims. (Cl. 37—43)

This invention relates to snow plows.

It is one of the objects of the present invention to provide a snow plow which is an improvement on the snow plow disclosed in application for U. S. Letters Patent, S. N. 103,432, filed by me on July 7, 1949, and entitled Snow Plow, now Patent No. 2,736,111.

It is an object of my invention to provide a novel and improved snow plow wherein provision is made for a substantially greater degree of disintegration of the snow and for preventing the snow from escaping the confines of the moldboard prior to its conveyance into the blower.

Another object is to provide a highly efficient snow plow which includes a snow disintegrating conveyor mounted in a moldboard whereon a snow discharging blower is centrally mounted, the said conveyor including a shaft, concavo-convex arms mounted on the shaft and projecting outwardly therefrom, the leading edge of these arms extending substantially radially from the shaft and providing a slicing action to facilitate the disintegration of the snow, the arms being longitudinally and circumferentially spaced from each other and being disposed in outwardly directed spiral patterns relative to the direction of rotation of the shaft, and paddle structure mounted on the shaft directly ahead of the blower and receiving from the arms to facilitate the movement of the snow into the confines of the blower.

Another object is to provide a novel and improved snow plow of the type described in the immediately preceding paragraph wherein positive means is provided for protecting the conveyor against injury while passing over obstacles such as curbs and the like and for simultaneously cutting a path for such conveyor.

Another object is to provide a snow plow including structure which inherently tends to prevent any material portions of the disintegrated snow from escaping the confines of the moldboard without being forced or drawn into the blower.

Another object is to provide a snow plow of the class described wherein each of the arms are arranged and constructed to cause the same to move the snow laterally into the path of the adjacent arm toward the blower in position so that such adjacent arm will divide the load substantially medially with its leading edge and thereby substantially increase the disintegrating action to which the snow is subject prior to its delivery into the blower.

These and other objects and advantages of my invention will be more apparent from the following description made in connection with the accompanying drawings, wherein like reference characters refer to similar parts throughout the several views and in which:

Fig. 1 is a plan view of one embodiment of my invention mounted on a propelling vehicle, in this instance, a tractor;

Fig. 2 is a side elevational view of the same.

Fig. 3 is a detailed front elevational view of the embodiment shown in Fig. 1;

Fig. 4 is a sectional view taken along line 4—4 of Fig. 3 and showing the respective conveyor arms over to the center of the blower.

Fig. 5 is a schematic view of a second embodiment of my invention showing the distinguishing structure in elevation;

Fig. 6 is a front elevational view of a single arm and its cutting blade;

Fig. 7 is a side elevational view of the paddle structure used to propel snow into the rotor.

Figs. 1–2 show one embodiment of my invention mounted on a tractor indicated generally as T. A pair of pivot arms 10 and 11 are pivotally mounted by their rear end portion to the housing of the tractor T as at 12 and 13. Extending between the forward end portion of the pivot arms 10 and 11 is a cross arm 14 which in turn is connected to a hydraulic lifting mechanism 15 which may be activated by the tractor itself. Since this lifting mechanism 15 is not considered part of the invention is has been shown only in side elevation.

Secured to each of the forward ends of the pivot arms 10 and 11 is a U shaped bracket 16 which is rigidly connected, as by welding, to a transversely extending cross bar 17. Extending forwardly from each end of the cross bar 17 is a support arm 18 and rigidly secured by angle brackets 19 to the support arm is a housing or plow frame structure indicated generally as H.

The housing H includes an arcuately shaped moldboard 20, the open portion of which faces forwardly and the upper and forwardmost edge of which supports an upwardly and diagonally extending flange 20a. The central portion of the moldboard 20 has an opening 21 formed therein to communicate with the interior of a blower B.

This blower B is comprised of a generally cylindrically shaped housing 22 and a rotor 23 mounted therein for rotation. The rotor housing 22 has a tangential discharge opening 24. The rotor 23 is provided with a plurality of flinging arms 25 which extend rearwardly rather than radially with respect to the axis of rotation and the direction of such rotation. This can best be seen in Fig. 3. The housing 22 is pivotally secured to the moldboard 20 by the inwardly extending flange 20a and its interior communicates with the confines of the moldboard 22 by way of the opening 21.

Journalled in the forward end portion of the support arms 18 is a conveyor structure indicated generally as C for rotation on a horizontal axis. This conveyor structure C is comprised of a disintegrator shaft 26 which carries a plurality of hubs 27 to each of which a pair of outwardly extending arms 28 is attached. Each arm 28 is of concavo-convex form in cross-section, as best seen in Fig. 6, and each arm at its outer end and forwardmost edge carries a cutting blade 29.

The cutting blade 29 has the shape of a four sided polygon, none of the sides of which are parallel. Each blade 29 projects slightly forward relative to the advancing edge of the arm 28 to which it is secured and extends generally transversely of the arm, the outer end of the arm being cut to extend at slightly less than a right angle from the advancing edge 30 of the arm whereby the blade 29 attached to the arm is also caused to lie in a plain at slightly less than a right angle relative to the advancing edge of the arm 28 to which it is attached.

Each blade 29 has two sharpened forward edges, the bevel of these edges inclining inwardly relative to the hub 27 to which the arm and blade are secured. Also, both advancing edges of each blade 29 are set in V relation relative to each other. The rear edges of the blade converge from the point where they join the forward edges and these rear edges are also preferably of equal length. The particular portion of each arm 28 to which a blade 29 is secured is flat throughout the greater portion of the length of the blade but adjacent the point where the rearward edges of the blade meet the arm has already assumed a portion of its concavo-convex curvature.

Each of the concavo-convex arms 28 is so constructed and so arranged with respect to the hub 27 that the leading or advancing edge 30 extends substantially radially with respect to the shaft 26. The remaining portion of the arm 28 extends rearwardly with respect to the direction of rotation of the shaft 26, the over-all shape of each arm if flattened out being substantially that of a quarter circle.

The various arms 28 are made in rights and lefts so arranged that the concave sides of the arms 28 to the left and right of the center of the shaft 26 taken longitudinally thereof, face toward the said center. This is to permit the arms to the left of the plow to throw centrally and toward the right of the plow and to permit the arms at the right side of the plow to throw the snow contacted by the arms during their rotation centrally and toward the left of the plow. The circumferential spacing of the arms 28 carried by the hub 27 and the mounting of the hub 27 on the particular shaft 26 to which the hubs are secured is such that the arms to the left of the longitudinal center of the shaft will form a spiral pattern from the center of the shaft to the left end of the shaft. In a similar but opposite manner, the arms to the right of the longitudinal center of the shaft are arranged to form another spiral pattern from the center of the shaft to the right end of the shaft.

Each of these two spiral patterns is arranged to work outwardly relative to the direction of rotation of the shaft 26, the direction of rotation of the shaft being counterclockwise as viewed in Fig. 2. This is to permit the inner arms and blades to cut and throw the snow inwardly prior to the time that the outer arms and blades cut and throw, thereby relieving or preventing congestion of the snow inwardly from the blades cutting and throwing the snow at any given instance. This prevents massing of the snow centrally of the moldboard 20.

The angular circumferential spacing of each arm carried by the shaft 26 relative to the axis of rotation of the shaft is different. This is for the purpose of causing only one arm and blade carried by the shaft to strike and cut into the snow ahead of the moldbard 20 at a particular level at any one time, thereby conserving on the power required to rotate the shaft 26 and concentrating the main cutting power available on one blade and arms at a time. The blades 29 are of such width relative to each other and to the spacing of the arms 28 longitudinally of the shaft 26 that the paths taken by adjacent blades will silghtly over-lap each other, thereby assuring that all snow or ice ahead of the disintegrating conveyor C will be attacked by one or more of the blades 29.

The entire conveyor is comprised of a plurality of hubs 27 with their respective conveyor arms 28, each of these hubs being fixidly secured to the shaft 26 by shear pins 31. The respective arms 28 have been designated in Fig. 3 as 28a, 28b, 28c, etc. working outwardly from the center of the shaft 26 for the sake of convenience in discussion.

Mounted on the disintegrator shaft 26 directly ahead of the center of the rotor 23 is a paddle structure indicated generally as P. This paddle structure is positioned to receive the snow from the conveyor arms to the right and to the left of the center of the blower. It consists of a hub 32 and a plurality of paddles 33 which extend outwardly from the hub and rearwardly with respect to the direction of rotation of the shaft 26 as best shown in Fig. 7.

Mounted on each end of the shaft 26 for rotation therewith is a pair of end discs 34 which are slightly larger in diameter than the diameter of the orbit of the blades 29. Each of these discs is constructed of a rigid material, preferably metal, and each carries a plurality of blades 35 secured to its peripheral portions, these blades being similar in structure to the blades 29. The portions of the discs 34 to which the blades 35 are secured are bent slightly outwardly with respect to the general plane of the disc as best shown at 36 in Fig. 3. This is made possible by forming a slit which extends radially from the outer periphery of the disc toward the center. The peripheral portion of the disc immediately ahead of the blade 35 is bent slightly inwardly as at 37. Each of these discs 34 is rigidly secured by shear pins 38 to the shaft 26 to cause the same to rotate therewith.

The blower B and the conveyor shaft C may be driven by driving connections with the power take off on the tractor T or they may be driven by a separate source of power and appropriate gear mechanism, as shown. In the embodiment shown the shaft 26 is provided with a gear 39 adjacent one of its ends and this gear is connected to a second gear 40 which in turn is connected by a countershaft 21 to a gear box 42. The gears in the gear box 42 are driven by a motor indicated generally as M. A shaft 43 extends forwardly from the gear box to drive the rotor 23 of the blower B. Since the driving mechanism for the conveyor C and the blower B is not considered part of the invention this portion of the structure has been shown only generally. The entire motor and driving mechanism may be supported by a cross yoke 44 which extends transversely between the forward ends of the pivot arm 10 and 11.

Fig. 5 shows a second embodiment of my invention wherein the paddle structure P is replaced by a solid disc 45, the diameter of this disc being slightly greater than the diameter of the path of the blades 29 and equal to the diameter of the end disc 34. This central dividing disc provides protection to the blades 29 against injury which might be caused by an obstacle which might lie in the path of the central portion of the conveyor C.

*Operation*

As the conveyor C is driven by the motor M, the end discs 34 and their blades 35 define a pathway for the conveyor. As the conveyor C rotates each of the arms 28 will rotate therewith and the blade 29 thereof will cut the snow ahead of the conveyor. The leading edge 30 of each arm which is relatively sharp provides an improved slicing action to more effectively cut and disintegrate the hard and crusted snow which may be engaged thereby. Each of the arms delivers its load of snow to the adjacent inner arm, the snow thus being gradually conveyed to the center of the moldboard 20 and delivered to the paddle structure P. The paddle structure P positively engages and urges the snow into the discharge opening 21 and into the path of the rotor 23 for efficient discharge thereby. The shape of the paddles 33 causes a majority of the amount of snow to be fed to the outer portions of the rotor 23 and thus a maximum amount of speed is consequently imparted to the snow particles. This results in the snow being flung a maximum distance through the discharge 24 to points well beyond the side of the road. The paddle structure P positively prevents massing of the snow around the central portions of the conveyor. This is especially important when wet snow is being handled since the weight of such snow is so much greater than that ordinarily encountered and it cannot be drawn by suction into the confines of the blower B so readily.

It should be noted that each of the arms 28 are positioned with respect to its adjacent inner arm that the load of snow engaged thereby will be delivered directly to the center of the path of the leading edge 30 of its adjacent inner arm. For example the load of snow engaged by the arm 28j delivers its load of snow directly into the path of the leading edge of the arm 28i. The leading edge 30 of the arm 28i will divide this load of snow substantially medially and thereby greatly increase the amount of the total disintegrating action to which the snow is subjected by the time that it reaches the central portion of the shaft 26. Thus it can be readily seen that this type of conveyor will have the snow engaged thereby very finely disintegrated by the time it is delivered to the blower. I have found that this type of conveyor, because of its increased disintegrating action, is capable of handling any of the many types of snow in an efficient manner and makes it possible for the blower to eject the snow to much greater distances than has been heretofore possible. It is understood of course that the load of snow moved laterally by each of the arms is divided by its adjacent inner arm throughout the length of the shaft 26.

The concave shape of the arm 28 and the outline of these arms being substantially that of a quarter circle provides a structure which effectively holds substantially all of the disintegrated snow within the confines of the moldboard. This is an important feature since it prevents the snow from being thrown upwardly and forwardly in the form of a cloud and thus obstructing the vision of the driver of the snow plow.

The end discs 34 in addition to defining a path for the conveyor in an effective manner, serve as guards to prevent injury to the arms 28 and their blades 29 in the event that an obstacle is encountered or in the event that the end of the snow plow is run upwardly over a curb or the like. When the dividing disc is used in conjunction with the end disc 34 it provides added protection against such injury. The snow is drawn inwardly by the suction created by the rotor 23 when such a dividing disc is utilized.

In the event that injury does occur to one of the arms 28 or its blade 29 despite the protection afforded by the end disc 34, it is a relatively simple matter to remove the hub 27 to which it is secured and substitute a new member therefor.

It will, of course, be understood that various changes may be made in the form, details, arrangements and proportions of the parts without departing from the scope of my invention.

What I claim is:

1. A snow plow comprising a moldboard, a blower adjacent to said moldboard receiving therefrom and discharging upwardly therefrom, supports projecting forwardly from the ends of said moldboard, a snow disintegrating conveyor working within said moldboard, said conveyor comprising a shaft journaled in said supports, concavo-convex arms mounted on said shaft and projecting outwardly therefrom said arms being longitudinally and circumferentially spaced from each other along said shaft in spiral pattern outwardly directed from said blower relative to the direction of rotation of said shaft, the concave sides of the arms facing inwardly toward the portion of said shaft adjacent said blower, said arms being of such number and spacing longitudinally of said shaft that one arm will move the load of snow engaged thereby laterally toward said blower and directly into the path of its adjacent arm toward said blower to be further disintegrateed and substantially medially divided by such adjacent arm, and means for rotating said shaft.

2. The structure defined in claim 1, the leading edge of at least some of said arms extending substantially radially to said shaft to provide a slicing action and thereby facilitate the disintegration of the snow engaged thereby.

3. The structure defined in claim 1, said conveyor having cutter blades fixed to the outer ends of said arms, the blades being of such number and width that the path cut by one blade during rotation of said shaft will overlap at least slightly the path cut by adjacent blades.

4. A snow plow comprising a moldboard, a blower receiving centrally therefrom and discharging upwardly therefrom, supports projecting forwardly from the ends of said moldboard, a snow disintegrating conveyor working within said moldboard, said conveyor comprising a shaft journaled in said support, concavo-convex arms mounted on said shaft for rotation therewith and projecting outwardly therefrom and being longitudinally and circumferentially spaced from each other outwardly from the central portions of said shaft in spiral patterns which are outwardly directed relative to the direction of rotation of said shaft, the concave sides of the arms to the right and to the left of the central portion of said moldboard facing inwardly and the arms being of such number and of such spacing longitudinally of said shaft that one arm will move the load of snow engaged thereby during rotation of said shaft laterally and directly into the path of its adjacent arm toward said blower to be further disintegrated and substantially medially divided by such adjacent arm, and means for rotating said shaft.

5. A snow plow comprising a moldboard, a blower receiving centrally therefrom and discharging upwardly therefrom, supports projecting forwardly from the ends of said moldboards, a snow disintegrating conveyor working within said moldboard and including a shaft journaled in said support, a pair of discs mounted on the shaft for rotation therewith one each being disposed adjacent each end of said moldboard and forming in cooperation with said moldboard a closure for the end portion thereof, said discs being of a diameter greater than the diameter of said conveyor to provide a guard against injury to said conveyor from obstructions passed over by the end portions thereof, and means for rotating the shaft.

6. The structure defined in claim 5, each of said discs having a plurality of cutter blades fixed to the outer peripheral portions thereof to disintegrate the snow adjacent the ends of said conveyor.

7. A snow plow comprising a moldboard, a blower adjacent to said moldboard and receiving therefrom and discharging upwardly therefrom supports projecting forwardly from the ends of said moldboard, a snow disintegrating conveyor working within said moldboard, said conveyor comprising a shaft journaled in said supports, concavo-convex arms mounted on said shaft and projecting outwardly therefrom, said arms being longitudinally and circumferentially spaced from each other along said shaft in spiral pattern outwardly directed from said blower relative to the direction of rotation of said shaft, the concave sides of the arms facing inwardly toward the point of reception of said blower from said moldboard, said arms being of such number and spacing longitudinally of said shaft that one arm will move the load of snow engaged thereby laterally toward said blower into the path of its adjacent arm toward the said blower to be moved thereby further laterally toward said blower, paddle structure mounted on said shaft for rotation therewith adjacent said blower and receiving from said arms and delivering into said blower, and means for rotating said shaft.

8. A snow plow comprising a moldboard, a blower receiving centrally therefrom and discharging upwardly therefrom, supports projecting forwardly from the ends of said moldboard, a snow disintegrating conveyor working within said moldboard, said conveyor comprising a shaft journaled in said supports, concavo-convex arms mounted on said shaft and projecting outwardly therefrom and cutter blades fixed to the outer ends of said arms, said arms being longitudinally and circumferentially spaced from each other outwardly from the central portions of said shaft in spiral patterns which are outwardly directed relative to the direction of rotation of said shaft, the concave sides of the arms to the right and to the left of the central portions of said moldboards facing inwardly and the blades being of such number and width and spacing longitudinally of said shaft that one blade will move the load of snow engaged thereby laterally into the path of its adjacent blade toward said blower to be further disintegrated and substantially medially divided by such adjacent blade, paddle structure mounted on said shaft for rotation therewith directly ahead of the point of reception of said blower and receiving from said arms and delivering to said blower and urging from said moldboard the snow delivered thereto rearwardly into the blower, and means for rotating said shaft.

9. The structure defined in claim 8 said paddle structure having arcuately shaped paddle arms curved rearwardly with respect to the direction of rotation of said shaft, said arms having concavely shaped snow-engaging surfaces.

10. The structure defined in claim 8 the over-all diameter of said paddle structure being slightly less than the diameter of said conveyor to prevent injury to said structure.

11. A snow plow comprising a moldboard, a blower receiving centrally therefrom and discharging upwardly therefrom supports projecting forwardly from the ends of said moldboard, a snow disintegrating conveyor working within said moldboard, said conveyor comprising a shaft journaled in said supports, concavo-convex arms mounted on said shaft for rotation therewith and projecting outwardly therefrom, and cutter blades fixed to the outer ends of said arm, said arms being longitudinally and circumferentially spaced from each other outwardly from the central portions of said shaft in spiral patterns which are outwardly directed relative to the direction of rotation of said shaft, the concave sides of the arms to the right and to the left of the central portion of said moldboard facing inwardly and the blades being of such number and width that the path cut by one blade during rotation of said shaft will over-lap at least slightly the path cut by adjacent blades, said arms being of such number and spacing longitudinally of said shaft that one arm will move the load of snow engaged thereby laterally toward said blower, and directly into the path of its adjacent arm toward said blower to be further disintegrated and substantially medially divided by such adjacent arm, a disc mounted on said shaft for rotation therewith directly ahead of said blower and dissecting vertically the area directly ahead of the entrance of the blower, and means for rotating said shaft.

12. The structure defined in claim 11 the diameter of said disc being slightly greater than the orbit of the cutter blades on said arms to provide means for causing said conveyor and its blades to pass without injury thereto over an obstruction lying directly ahead of said blower.

13. A snow plow comprising a moldboard, a blower receiving centrally therefrom and discharging upwardly therefrom, supports projecting forwardly from the ends of said moldboard, a snow disintegrating conveyor working within said moldboard, said conveyor comprising a shaft journaled in said supports, a plurality of variable pitch conveyor segments mounted on said shaft for rotation therewith and projecting outwardly therefrom and cutter blades fixed to the outer end of said segments, said variable pitch conveyor segments being longitudinally and circumferentially spaced from each other outwardly from the central portions of said shaft in spiral patterns which are outwardly directed relative to the direction of rotation of said shaft, the variable pitch conveyor segments to the right and to the left of the central portion of said moldboard facing inwardly, these segments being of such number and spacing that the path cut by one of such segments will move the load of snow engaged thereby laterally into the path of its adjacent segment toward said blower in position to be further disintegrated and substantially medially divided by such adjacent segment, and means for rotating said shaft.

14. A snow plow comprising a moldboard; a blower receiving centrally therefrom and discharging upwardly therefrom; supports projecting forwardly from the ends of said moldboard; a snow disintegrating conveyor working within said moldboard; said conveyor comprising a shaft journaled in said supports, concavo-convex arms mounted on said shaft and projecting outwardly therefrom and cutter blades fixed to the outer ends of said arms, said arms being longitudinally and circumferentially spaced from each other from the central portion of said shaft in spiral patterns which are outwardly directed relative to the direction of rotation of said shaft, the concave sides of the arms to the right and to the left of the central portion of said moldboard facing inwardly, said arms being of such number and width and spacing longitudinally of said shaft that one such arm will move the load of snow engaged thereby laterally and directly into the path of its adjacent blade toward said blower in position to be further disintegrated and substantially medially divided by such adjacent arm; means for rotating said shaft; a protector disc mounted on said shaft for rotation therewith directly ahead of said blower; and a pair of end discs mounted on said shaft adjacent each end of said moldboard and forming closures therefor and rotating with said shaft, each of said end discs having cutter blades fixed to the outer periphery thereof and each of said end discs and said protector disc being slightly larger in diameter than the orbit of the cutter blades of said conveyor.

15. A snow plow comprising a moldboard; a blower receiving centrally therefrom and discharging upwardly therefrom; supports projecting from the ends of said mold board; a snow disintegrating conveyor working within said moldboard, said conveyor comprising a shaft journaled in said supports, concave-convex arms mounted on said shaft and projecting outwardly therefrom and cutter blades fixed to the outer end of said arms, said arms being longitudinally and circumferentially spaced from each other from the central portions of said shaft in spiral patterns which are outwardly directed relative to the direction of rotation of said shaft, the concave sides of the arms to the right and to the left of the central portion of said moldboard facing inwardly and the leading edge of each of said arms extending substantially radially to said shaft to provide slicing action when snow is engaged thereby and the blades being of such number and width that the path cut by one blade during rotation of said shaft will over-lap at least slightly the path cut by adjacent blades, said arms being of such number and width and spacing longitudinally of said shaft that one such arm will during rotation of said shaft move the load of snow engaged thereby laterally and directly into the path of its adjacent blade toward said blower to be further disintegrated and substantially medially divided by such adjacent arms; means for rotating said shaft; an end disc mounted on said shaft for rotation therewith adjacent each of the ends of said moldboard and forming closures therefor, said end discs having cutter blades fixed to their outer peripheral portions; and a protector disc mounted on said shaft for rotation therewith directly ahead of said blower and dissecting vertically the entrance thereto, each of said end discs and said protector disc being slightly larger in diameter than the orbit of the cutter blades of said conveyor.

16. A snow plow comprising a moldboard; a blower receiving centrally therefrom and discharging upwardly therefrom; supports projecting forwardly from the ends of said moldboard; a snow disintegrating conveyor working within said moldboard, said conveyor comprising a shaft journaled in said support, concavo-convex arms mounted on said shaft and projecting outwardly therefrom, and cutter blades fixed to the outer ends of said arms, said arms being longitudinally and circumferentially spaced from each other outwardly from the central portion of said shaft in spiral patterns which are outwardly directed relative to the direction of rotation of said shaft, the concave sides of the arms to the right and to the left of the central portions of said moldboards facing inwardly toward said blower, said arms being of such number and spacing longitudinally of said shaft that one such arm during rotation of said shaft will move the load of snow engaged thereby laterally and directly into the path of its adjacent blade toward said blower in position to be further disintegrated and substantially medially divided by such adjacent arm; means for rotating said shaft; and paddle structure mounted on said shaft for rotation therewith directly ahead of said blower and receiving from said conveyor and delivering to said blower to facilitate the conveyance of the snow into the interior of said blower.

17. A snow plow comprising a moldboard; a blower receiving centrally therefrom and discharging upwardly therefrom; supports projecting forwardly from the ends of said moldboad; a snow disintegrating conveyor working within said moldboard, said conveyor comprising a shaft journaled in said support, a plurality of concavo-convex arms mounted on said shaft for rotation therewith, the leading edge of each of said arms extending substantially radially outwardly from said shaft, and cutter blades fixed to the outer ends of said arms, said arms being longitudinally and circumferentially spaced from each other from the central portion of said path in spiral patterns which are outwardly directed relative to the direction of rotation of said shaft, the concave sides of the arms to the right and to the left of the central portion of said moldboard facing inwardly, said arms being of such number and spacing longitudinally of said shaft that one such arm will move the load of snow engaged thereby laterally and directly into the path of its adjacent arm toward said blower in position to be further disintegrated and substantially medially divided by such adjacent arm, and the blades being of such number and width that the path cut by one blade during rotation of said shaft will over-lap at least slightly the path cut by adjacent blades; means for rotating said shaft; and paddle structure mounted on said shaft for rotation therewith directly ahead of said blower and receiving from said conveyor and delivering to said blower to facilitate the conveyance of the snow into the interior of said blower.

18. A snow plow comprising a moldboard; a blower receiving centrally therefrom and discharging upwardly therefrom; supports projecting forwardly from the ends of said moldboard; a snow disintegrating conveyor working within said moldboard, said conveyor comprising a shaft journaled within said supports, concavo-convex arms mounted on said shaft for rotation therewith and projecting outwardly therefrom, said arms being of such number and spacing longitudinally of said shaft that one such arm will move the load of snow engaged thereby during rotation laterally and directly into the path of its adjacent arm toward said blower to be further disintegrated and substantially medially divided by such adjacent arm, said arms being longitudinally and circumferentially spaced from each other outwardly from the central portion of said shaft in spiral patterns which are outwardly directed relative to the direction of rotation of said shaft, the concave sides of the arms to the right and to the left of the central portion of said moldboard facing inwardly, and cutter blades fixed to the outer ends of said arm and being of such number and width that the path cut by one blade during rotation of said shaft will over-lap at least slightly the path cut by adjacent blades; means for rotating said shaft; a pair of end discs mounted on said shaft for rotation therewith one each adjacent the ends of said moldboard and forming a closure therefor, said end discs being of slightly larger diameter than the orbit of the blades of said conveyor and having cutter blades mounted on their outer peripheral portions; and paddle structure mounted on said shaft for rotation therewith directly ahead of said blower and receiving snow from said conveyor and delivering the same to said blower to facilitate the conveyance of the snow into the interior of said blower.

19. A snow plow comprising a moldboard, a blower adjacent to said moldboard receiving therefrom and discharging upwardly therefrom, supports projecting forwardly from the ends of said moldboard, a snow disintegrating conveyor working within said moldboard, said conveyor including a shaft journaled in said supports, concavo-convex arms mounted on said shaft and projecting outwardly therefrom, said arms being longitudinally and circumferentially spaced from each other along said shaft in spiral pattern outwardly directed from said blower relative to the direction of rotation of rotation of said shaft, the concave sides of the arms facing inwardly toward the portion of said shaft adjacent said blower, said arms being of such number and spacing longitudinally of said shaft that one arm will move the load of snow engaged thereby laterally toward said blower and directly into the path of its adjacent arm toward said blower to be further disintegrated and substantially medially divided by such adjacent arm, means mounted on the central portion of said shaft for rotation therewith directly ahead of said blower and dividing said conveyor medially into right and left hand portions, and means for rotating said shaft.

References Cited in the file of this patent

UNITED STATES PATENTS

| | | |
|---|---|---|
| 1,520,916 | Townsend | Dec. 30, 1924 |
| 1,810,069 | Bosworth | June 16, 1931 |
| 1,820,707 | Moen et al. | Aug. 25, 1931 |
| 2,144,316 | Klauer | Jan. 17, 1939 |
| 2,198,237 | Voorderman | Apr. 30, 1940 |
| 2,246,015 | Sims | June 17, 1941 |
| 2,353,928 | Piltz | July 18, 1944 |
| 2,387,422 | Venable | Oct. 23, 1945 |
| 2,498,522 | Berg et al. | Feb. 21, 1950 |
| 2,736,111 | Moen | Feb. 28, 1956 |

FOREIGN PATENTS

| | | |
|---|---|---|
| 548,096 | France | Aug. 7, 1928 |